Oct. 11, 1960 M. M. LIGHT 2,955,575
LUBRICANT-IMMERSED OUTDOOR MOTOR STRUCTURE
Filed Jan. 20, 1958 3 Sheets-Sheet 1
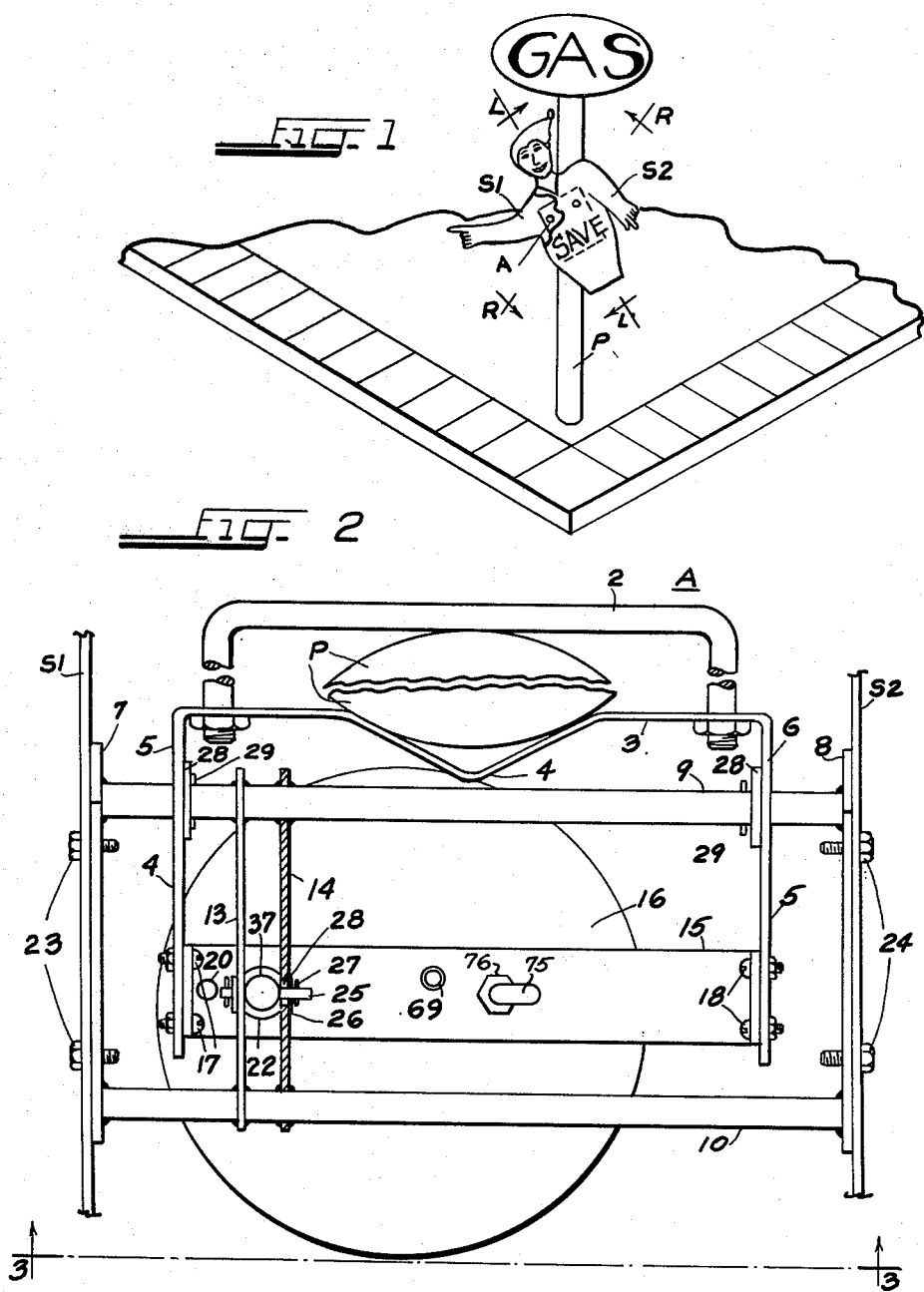
INVENTOR.
MAURICE M. LIGHT
BY
Kegan, Bellamy & Kegan
Att'ys.

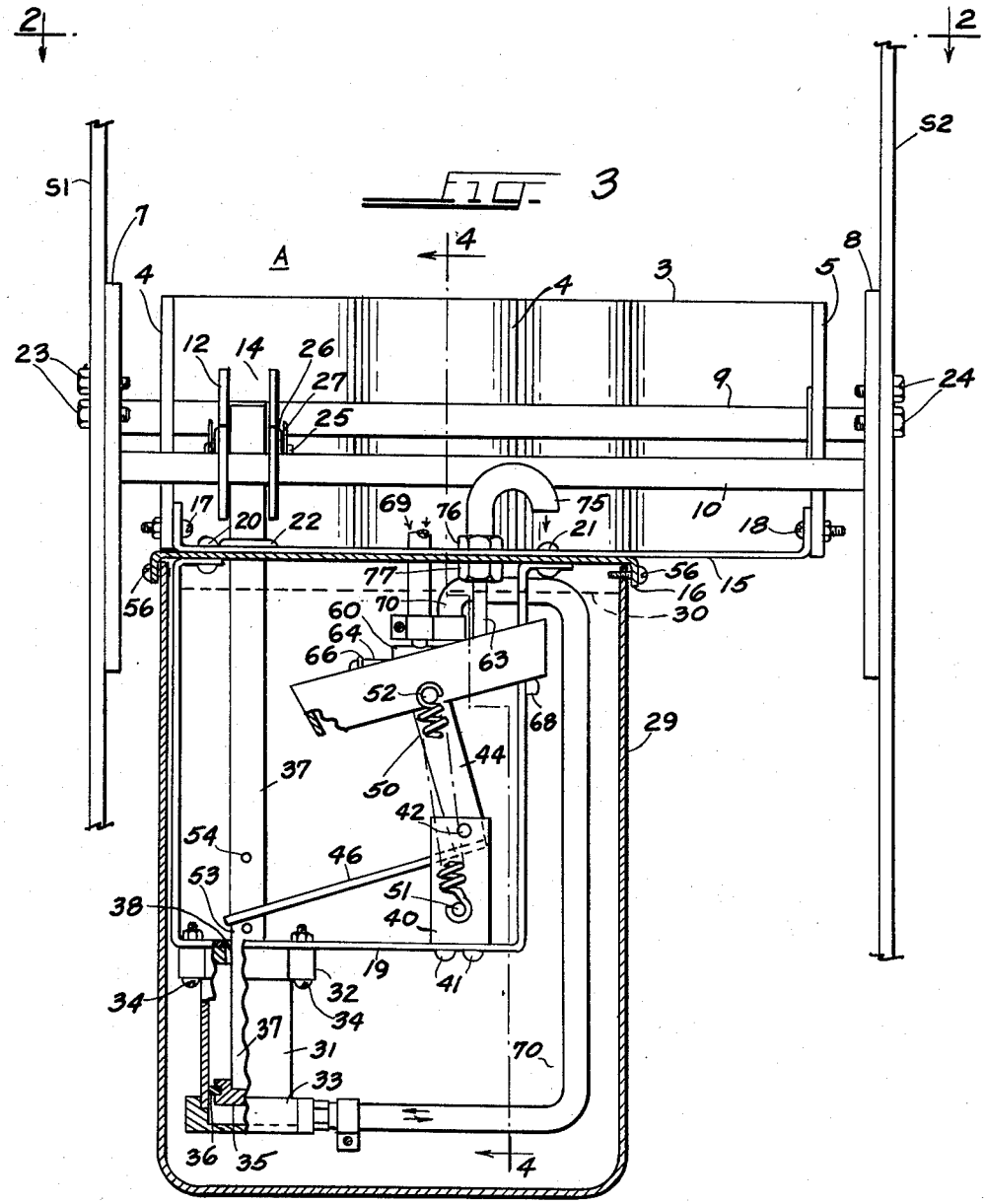

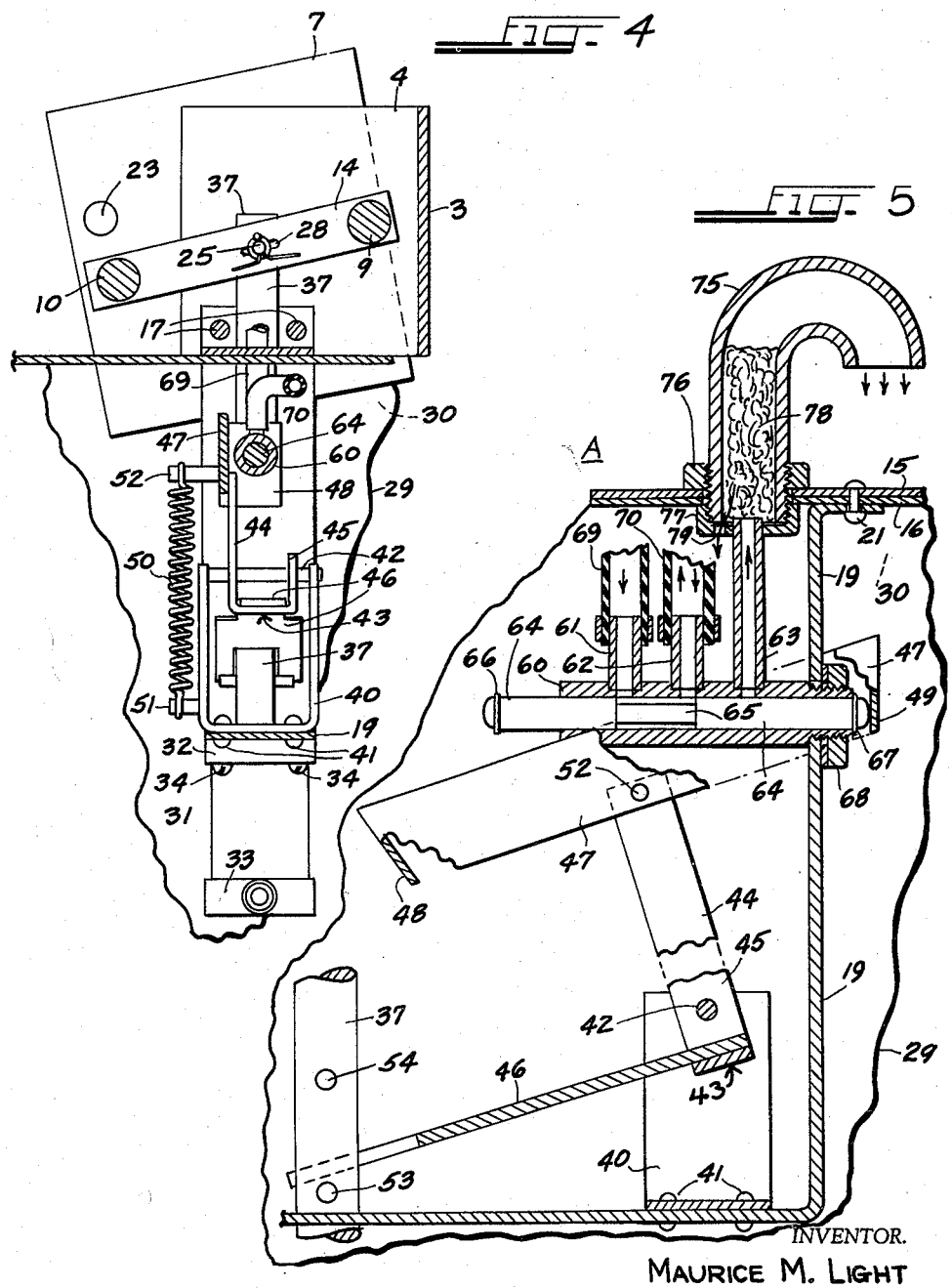

United States Patent Office 2,955,575
Patented Oct. 11, 1960

2,955,575

LUBRICANT-IMMERSED OUTDOOR MOTOR STRUCTURE

Maurice M. Light, 324 N. Marion St., Oak Park, Ill.

Filed Jan. 20, 1958, Ser. No. 710,016

4 Claims. (Cl. 121—38)

This invention relates to a movable display structure, being concerned more particularly with structures of that type which include a motor mechanism protected against adverse weather conditions. The principal object of the invention is to provide a motor actuated structure of the foregoing type which is of simple construction, is economical to produce, and which is reliable in operation and is adapted to impart an attention-attracting back and forth movement to one or more signboards operatively associated therewith or loaded thereon.

This application is a continuation-in-part of my prior application for a movable display structure, Serial No. 677,299, filed August 9, 1957, and now abandoned.

Animated, or moving, outdoor display signs have heretofore been open to the drawback that they are of expensive construction and require excessive maintenance. For the most part, the desired back and forth movement has been imparted by an electric motor which requires a train of speed reduction gears and a lever system controlled thereby to impart the desired motion to the sign apparatus. Varying adverse weather effects, including great temperature changes, have rendered this construction subject to high maintenance costs because of the difficulty of maintaining the parts adequately lubricated under the varying weather conditions. Moreover, an electric motor creates some explosion-inducing action when used in a gasoline filling station or parking lot where automotive vehicles are stored, thus comprising a further drawback to the use of the conventional electric-motor-driven movable display structure.

According to the invention, the foregoing and other drawbacks of the prior structures are eliminated, and the previously stated principal objects of the invention are attained, by providing a movable display structure wherein the movement is imparted by a simple reciprocable pneumatic motor, preferably immersed in an oil bath.

Features of the improved construction are (1) no special packing rings or sealing cups are required at the moving piston of the structure nor at the sliding control valve, (2) dependable regulation of the speed of movement of the apparatus between positions is obtained by virtue of an in and out flow of the oil of submersion through a restricted passageway as the piston moves back and forth, (3) the oil of the oil bath is protected against the undue collection of moisture and against undue waste of oil with the exhausted air of the pneumatic motor by an oil trap through which the used charge of air is exhausted to atmosphere and in which exhausted particles of oil are caught and allowed to drain back into the oil reservoir, and (4) a simple single stroke cylinder is rendered feasible by biasing the moving structure to return, as by gravity, when the control valve transfers the driving side of the piston from compression to exhaust.

The foregoing and other objects and features of the invention, and the manner of obtaining them, will become more apparent, and the invention itself will be best understood, by reference to the following description of an embodiment of the invention taken in conjunction with the accompanying drawings comprising Figures 1 to 5, wherein:

Figure 1 is an over-all view of a structure embodying the invention and installed on a standard erected near a street corner;

Figure 2 is a top view of the structure of Figure 1 as it appears when seen from above and from the left;

Figure 3 is an elevation view partly in section taken along line 3—3 of Figure 2;

Figure 4 is a fragmentary view taken generally along line 4—4 of Figure 3; and

Figure 5 is an enlarged view of a portion of the apparatus as seen in Figure 3, but with additional parts broken away to show the underlying structure.

Referring first to Figure 1, the display apparatus comprises two signboards S1 and S2 in back to back relationship and each carried by actuator A which is secured to standard or post P as shown in Figure 2. The front signboard S2 as seen in Figure 1, is partly broken away to expose a part of the rear signboard S1 and a corner portion of actuator A. The signboards and actuator are shown in Figure 1 in their normal or power-off position. From this position, when power is applied to actuator A, the moving portion of the actuator and the two signboards S1 and S2 are rotated clockwise from the illustrated position of the diagonal line LL until that line is raised beyond the vertical position and assumes a final clockwise position about as shown by line RR, in which position power is automatically removed from the actuator A to permit the parts to return, by gravity in the illustrated example, to the position indicated in Figure 1. The purpose of the actuator A is to move the two signboards back and forth between the two positions alternately with only a momentary pause in either extreme position, to thereby attract the attention of observers and passers-by by virtue of the back and forth movement of the signboards S1 and S2.

Referring now to Figures 2 to 5, actuator A may be secured to post P by the U-shaped bracket 2 which is threaded at the ends to receive clamping nuts which clamp post P between clamp A and the stationary support bracket 3, which has an offset portion 4 to assist in its gripping engagement with post P.

Bracket 3 has side arms 5 and 6 to which rear rod 9 of the moving assembly passes and in which rod 9 is turnably supported, endwise movement of rod 9 being limited by pins 29 and washers 28. The moving assembly further includes front rod 10 and end plates 7 and 8 which are rigidly secured to the ends of rods 9 and 10, as by welding. End plates 7 and 8 may be tapped to receive bolts 23 and 24 which hold signboards S1 and S2 to the end plates 7 and 8.

Cross arms 13 and 14 have openings near the ends which receive rods 9 and 10; and the parts 9, 10, 13, and 14 may be rigidly secured together, as by welding. Preferably, the center of gravity of the sign-boards S1 and S2 falls somewhere between rods 9 and 10, which is forward of the pivoted rod 9, whereby the moving structure returns by gravity to the position illustrated in Figure 1.

The raising of the moving structure, as at rod 10, to cause it to turn about the axis of rod 9 is accomplished by drive rod 37 which is actuated from below for that purpose to move vertically upward when power is applied. Drive rod 37 has a cross pin 25 extending therethrough and received within a slot 28 of each of the cross arms 13 and 14. The pin 25 may be able to slide freely through rod 37. Its longitudinal movement within rod 37 is limited by pins 27 and washers 26.

The pneumatic motor structure is supported from the forward ends of arms 4 and 5 of bracket 3 by cross bracket 15 which is secured to the arms of the support bracket as by screws 17, 18. A flanged cover for the motor structure is provided at 16, and the motor structure is supported on a further underlying bracket 19 which is secured to bracket 15 as by rivets 20 and 21, which also hold cover 16 in place. Drive rod 37 passes vertically through cover 16 and bracket 15, and the space between the parts and surrounding rod 37 is preferably sealed as by a felt ring sealer 22 fixed with bracket 15 and surrounding rod 37. Parts 15 and 16 are further perforated to receive the air supply hose 69, and the receiving opening for 69 is preferably slightly undersized to provide a seal against the entry of moisture around the hose. The bent exhaust tube 79 also passes through parts 15 and 16 but this connection is readily sealed against the entry of moisture by end cap 77 and lock nut 76 which are threaded onto the lower end of bent tube 75.

The pneumatic motor is enclosed by a cup-like receptacle 29 which is filled with lubricating oil as to the indicated level 30 (Figures 3 to 5). Container 29 may be held assembled within the depending flange of cover 16 as by three or four sheetmetal screws 56. The pneumatic motor for drive rod 37 includes a cylinder attached to the underside of depending bracket 19 by screws 34. This cylinder comprises an upper head 32 and a lower head 33 interconnected by a tube section 31, within which piston 35 is slidably received, the space between the periphery of piston 35 and the inside wall of 31 being sealed (as metal to metal) by a piston ring 36, which may be of the usual split construction to facilitate placement and removal. The lower end of drive rod 37 is rigidly fixed with the central portion of piston 35, as by a force fit. At the upper end of the cylinder assembly, cylinder head 32 receives drive rod 37 through an opening 38 which may provide a small clearance, such a 1/32 inch, around the drive rod for the admission and expulsion of oil to the interior of the cylinder above piston 35. The passageway through 32 and around drive rod 37 is thus somewhat restricted, which provides a regulating action on the upstroke of the piston. On the downstroke of the piston, under the influence of gravity, a similar regulating action occurs, for a downward movement of the piston faster than oil can be admitted above it tends to create a vacuum which regulates the descending action of the drive rod and piston.

As seen best in Figure 5, an alternate intake and exhaust condition is applied to the underside of the piston 35 of the pneumatic motor by way of the intake and exhaust hose 70 through the action of valve 60 with its plunger 64. Valve 60 is secured to the vertical portion of bracket 19 by nut 68 threaded onto the reduced right end portion of member 60. Body 60 has a straight bore therethrough which freely receives valve member 64, which is retained against unintended displacement by stop rings 66 and 67, which may be fitted into grooves near the ends of parts 64. An inner portion of member 64 is of reduced cross-section, at 65, to provide communication between the central port tube 62 and the one of the outer port tubes 61 and 63 which accords with the position of valve rod 64. In the position indicated in Figure 5, valve rod 64 is at the left, and portion 65 affords communication between the air supply port tube 61 (supplied with air under pressure by supply hose 69) and the intake and exhaust port tube 62, which is connected through local hose 70 of Figure 3 to the inlet-outlet port of the cylinder, through the lower cylinder head 33. In this position of the control valve, air under pressure is admitted to the underside of piston 35 to raise the piston and the drive rod 37.

*Upstroke*

With air under pressure being supplied through the control valve and through hose 70, as from the usual storage tank of an automobile service station (preferably reduced to a constant pressure of around 25 pounds per square inch, as by a conventional pressure reducing valve), the air pressure on the underside of piston 35 and within cylinder tube 31 forces piston 35 upwardly, moving the drive rod 37 upwardly toward the actuated position of the apparatus. As noted, the upward movement is regulated in speed by the size of the orifice in upper cylinder head 32 through which rod 37 passes, keeping in mind that the space above piston 35 is filled with a lubricating oil within which the structure is immersed.

As the upward stroke progresses, carrying the signboards S1 and S2 toward the alternate position described hereinbefore in connection with Figure 1, connecting pin 25 carried at the upper end of drive shaft 37 slides longitudinally in slots 28 and members 13 and 14 because of the usual foreshortening (and reverse) effect occasioned by the turning of the parts (including connecting rods 9 and 10 and the rigidly attached end plates 7 and 8) about the axis rod 9.

When the upward stroke of rod 37 has progressed a short amount, the lower control pin 53 fixed therewith engages the underside of the valve control paddle 46, and starts to move that member upwardly, the result being that the valve rod 64 is suddenly snapped to its alternate position just as the structure approaches its upward limit of movement. The structure through which the desired snap action is given to the valve plunger is best seen in Figures 3 to 5. Paddle 46 is preferably bifurcate, providing arms passing on either side of drive rod 37, between control pins 53 and 54. Paddle 46 is attached to the bottom of a pivoted hanger member 43 having upstanding arms 44 and 45, and pivoted at 42 in upstanding bracket 40, which may be secured to bracket 19 as by rivets 41.

Valve actuating member 47 is secured to the upper end of arm 44, as by welding. It has rearwardly turned arms 48 and 49 which provide opposed surfaces for actuating valve rod 64 in one direction and in the other direction, according to which of the members 48 and 49 engages the associated end thereof. A snap-action tension spring 50 is attached between stationary pin 51, attached to bracket 40, and pin 52 attached to the valve actuating cross member 47. The dimensions of the parts and the relative spacing of pins 53 and 54 on drive rod 37 is such that the movement of valve rod 64, when it occurs, occurs with a snap action because of an over-center condition of tension spring 51 being then reached.

As paddle 46 is moved upwardly after its engagement by pin 53, the right-hand actuating portion 49 is moved away from valve rod 64, and the left-hand actuating portion 48 of part 47 is moved toward the left-hand end of valve rod 64, the movement of parts 44, 46, and 47 being around pivot 42 and against the tension of spring 50.

When drive rod 37 approaches the upper limit of the driving movement, actuating portion 48 is still not in engagement with the associated end of valve rod 64, but it may be closely approaching engagement. At about that point, attaching studs 51 and 52 for the tension spring 50 are aligned with pivot 42 about which the valve control parts turn. Any slight further upward movement of shaft 37, which is still progressing uninterruptedly, causes the spring 50 to drive the parts 44, 46 and 47 abruptly and fully to the right, incident to which tab 48 engages the left-hand end of valve rod 64 and moves rod 64 to its right-hand position, wherein communication is afforded between port tubes 62 and 63, and communication with entrance port tube 61 is blocked. The abrupt upward movement of the bifurcate end of paddle 46, which occurs at this time, brings this paddle up toward the then raised position of the upper pin 54 on drive shaft 37, but does not bring it into contact with that pin because of the elevated position of part 54.

Downstroke

With the valve rod 64 now in its right-hand position (not shown), the two-way port 62 is now in communication with the exhaust port 63 instead of with the inlet port 62. The area beneath piston 35 is thus exhausted to atmosphere through hose 70 and port tubes 62 and 63, and thence through the exhaust tube 75. Piston 35, together with drive rod 37 and attached parts, now descends under the action of gravity hereinbefore referred to. The descent of these parts is regulated by the relatively restricted opening 38 in upper piston head 32 through which rod 53 passes, and is thus regulated by the rate at which the oil within container 29 can flow into the space above piston 35 as it descends. The downward movement thus occurs with substantially the same deliberation as the upward movement, keeping in mind that suitable counterweights (not shown) may be provided to insure any desired similarity of, or difference between, the forward speed and the reverse speed.

When the downward movement is fairly underway, upper pin 54 of drive shaft 37 engages the upper side of paddle 46 and starts to move the parts attached thereto back toward their illustrated position. This movement occurs with the downward movement of drive shaft 37 until the downward limit of movement is approached, at which time alignment again occurs between the studs 51 and 52 and pivot 42. Any slight further downward movement of part 37 thus brings the parts beyond center, whereupon tension spring 50 brings parts 44, 46 and 47 suddenly back to their illustrated position, causing the right-hand valve control tab 49 to strike the right-hand end of valve plunger 64 and bring it from exhaust position to its illustrated input position in a sudden movement.

So long as air under pressure is supplied continuously to inlet hose 69, the foregoing action is repeated in successive cycles.

Since air obtained from a compression tank ordinarily contains substantial moisture, it is considered preferable to exhaust the air through tubes 63 and 75 to the atmosphere directly without direct communication with the interior of oil vessel 29, thereby preventing moisture contained within the operating air from collecting in the bottom of the vessel. It has been found, however, that, particularly when piston 35 or piston ring 36 becomes worn somewhat in use, considerable oil passes by parts 35 and 36, as well as passing alongside the surfaces of valve plunger 64, and mixes with the exhausted air, largely in finely divided droplet form. In order to reclaim this oil and to prevent the lowering of the oil level within vessel 29 at too great a rate, a loose filling of steel wool, cotton waste, or the like, is provided at 78 within the exhaust tube 75. The exhausted oil droplets collect in material 78 and coalesce into larger droplets, following which they merge and flow downwardly to collect at the bottom of end cap 77. The reclaimed oil passes through opening 79 down into the oil reservoir within vessel 29.

While I have described above the principles of my invention in connection with specific apparatus, it is to be clearly understood that this description is made only by way of example and not as a limitation to the scope of my invention.

I claim:

1. A weather-proof motor assembly adapted to operate outdoor motor-driven apparatus of the type which employs a fixed support structure having a motor-driven member movably mounted thereon, the motor assembly comprising an enclosing vessel adapted to be mounted on the fixed support structure and adapted to contain a lubricating and protecting liquid at least up to a predetermined level, a motor mounted within the enclosing vessel below the said predetermined level, a power-supply line extending into the vessel above the said level and continuing to the motor, and a linkage connection extending upwardly from the motor and passing outwardly from the vessel above the said level to facilitate connection thereof to the motor-driven member, the motor being adapted to be operated by power supplied over the power-supply line to actuate said linkage connection, and to be protected and lubricated by immersion in the said liquid, wherein the said motor is a pneumatic motor of the cylinder-piston type and includes a control valve actuated thereby and interposed in the said supply line within the vessel and below the said level, the control valve having an exhaust line extending therefrom upwardly out of the vessel, and baffle means located about the outer end of the exhaust line to collect any spray or droplets of the said liquid which may be carried by the exhaust line for drainage thereof back into the vessel.

2. A weather-proof motor assembly adapted to operate outdoor motor-driven apparatus of the type which employs a fixed support structure having a motor-driven member movably mounted thereon, the motor assembly comprising an enclosing vessel adapted to be mounted on the fixed support structure and adapted to contain a lubricating and protecting liquid at least up to a predetermined level, a motor mounted within the enclosing vessel below the said predetermined level, a power-supply line extending into the vessel above the said level and continuing to the motor, and a linkage connection extending upwardly from the motor and passing outwardly from the vessel above the said level to facilitate connection thereof to the motor-driven member, the motor being adapted to be operated by power supplied over the power-supply line to actuate said linkage connection, and to be protected and lubricated by immersion in the said liquid, wherein the said motor is a pneumatic motor of the cylinder-piston type and includes a control valve actuated thereby and interposed in the said supply line within the vessel and below the said level, the portion of the cylinder on one side of the piston communicating with the liquid of immersion through a restricted passageway through which the said liquid must flow in and out as the piston moves back and forth, thereby stabilizing the action and controlling the speed of movement in each direction.

3. A weather-proof motor assembly adapted to be mounted below the rocking axis of a rockably mounted support member, comprising a covered enclosing vessel and motor apparatus contained therein comprising a motor fixed within the vessel and a vertically reciprocable drive member operable by the motor and extending upwardly through the cover of the vessel to provide a rocking drive for the support member, a source of operating power for the motor comprising a power line entering the vessel through its said cover to leave the bottom of the vessel and the side walls liquid tight, the vessel being adapted to contain a lubricating liquid within which the motor and the lower portion of the said drive member are immersed for lubrication and for protection from the weather, the said motor being a pneumatic motor of the cylinder-piston type and including a control valve actuated thereby and interposed in the said supply line within the control vessel and below the said level, the control valve having an exhaust line extending upwardly out of the vessel and in communication with the control valve through the said lubricating liquid, and baffle means included in the exhaust line to collect any spray or droplets of the said liquid which may be carried by the exhaust line for drainage thereof back into the vessel.

4. A weather-proof motor assembly adapted to be mounted below the rocking axis of a rockably mounted support member, comprising a covered enclosing vessel and motor apparatus contained therein comprising a motor fixed within the vessel and a vertically reciprocable drive member operable by the motor and extending upwardly through the cover of the vessel to provide a rocking drive for the support member, a source of operating power for the motor comprising a power line entering the vessel through its said cover to leave the bottom of the vessel and the side walls liquid tight, the vessel being adapted to contain a lubricating liquid within which the motor and the lower portion of the said drive member are immersed for lubrication and for protection from the weather, the enclosing vessel comprising a cover adapted to be mounted fixedly in place and a vessel detachably secured to the fixed cover and supported thereby, means fixing the said motor with the cover while leaving it free from attachment to the detachable vessel, whereby the vessel may be detached from the cover and motor assembly for servicing which may include the replenishment or renewal of the lubricating liquid and the servicing of the motor.

References Cited in the file of this patent

UNITED STATES PATENTS

| | | |
|---|---|---|
| 928,100 | Berry | July 13, 1909 |
| 1,035,418 | Chouffet | Aug. 13, 1912 |
| 1,084,641 | Keating | Jan. 20, 1914 |
| 1,335,835 | Hoting | Apr. 6, 1920 |
| 1,550,933 | Tripplehorn | Aug. 25, 1925 |
| 1,661,466 | Cook | Mar. 6, 1928 |
| 1,667,559 | McCaleb | Apr. 24, 1928 |
| 2,090,575 | DeMotte | Aug. 17, 1937 |
| 2,245,940 | Seares | June 17, 1941 |
| 2,714,266 | Jauquet | Aug. 2, 1955 |
| 2,767,369 | Schindler | Aug. 16, 1956 |
| 2,898,888 | Geyer | Aug. 11, 1959 |